Sept. 8, 1959     W. B. CRANE     2,903,176
PAPERBOARD SHIPPING CRATE AND INTERLOCKED CRATE UNIT
Filed May 17, 1956     6 Sheets-Sheet 1
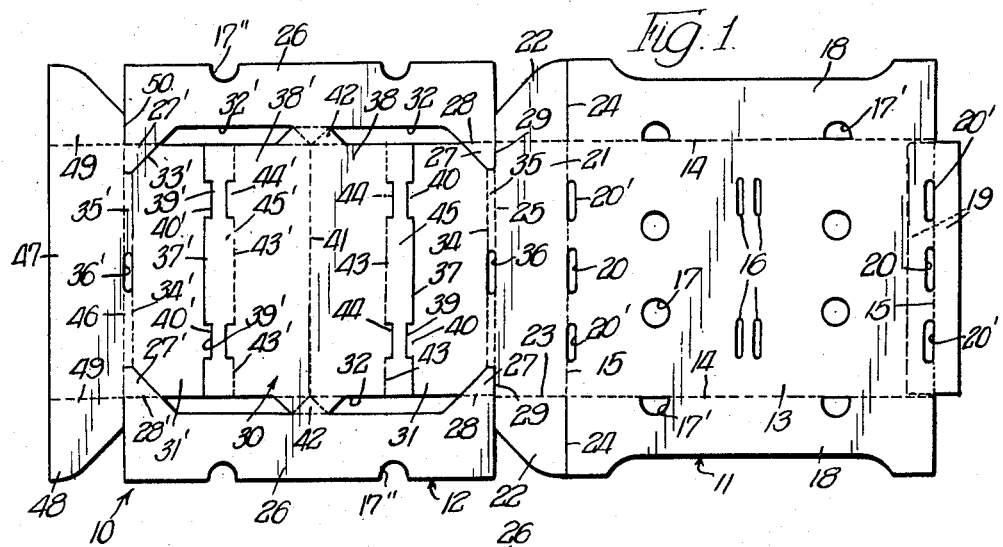
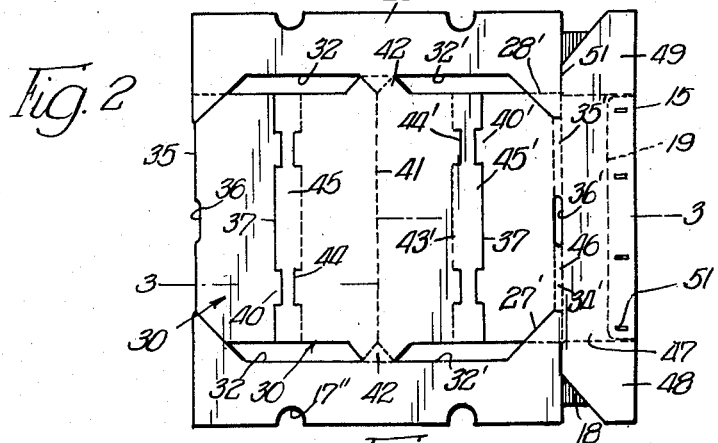
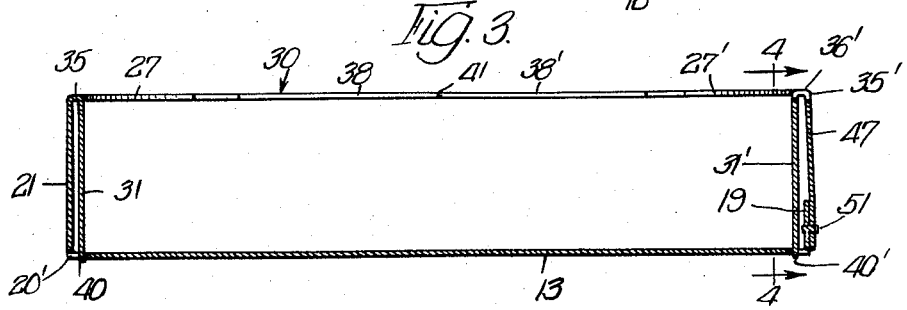
INVENTOR.
Walton B. Crane,
BY
Cromwell, Greist & Warden
Attys

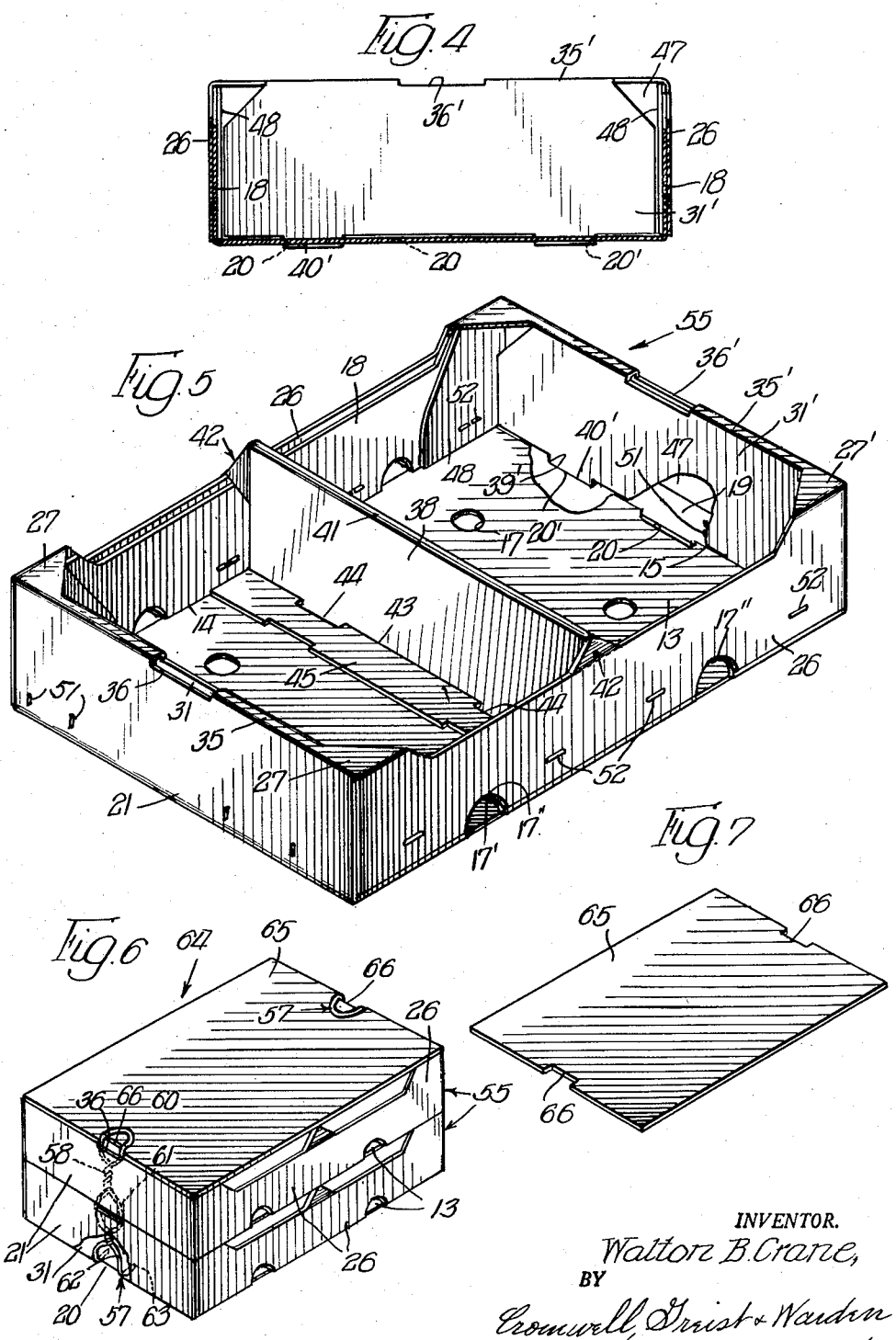

Sept. 8, 1959 W. B. CRANE 2,903,176
PAPERBOARD SHIPPING CRATE AND INTERLOCKED CRATE UNIT
Filed May 17, 1956 6 Sheets-Sheet 3
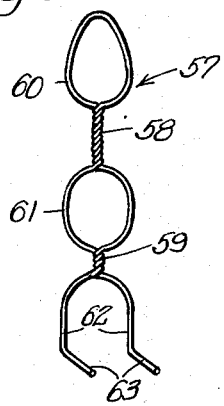
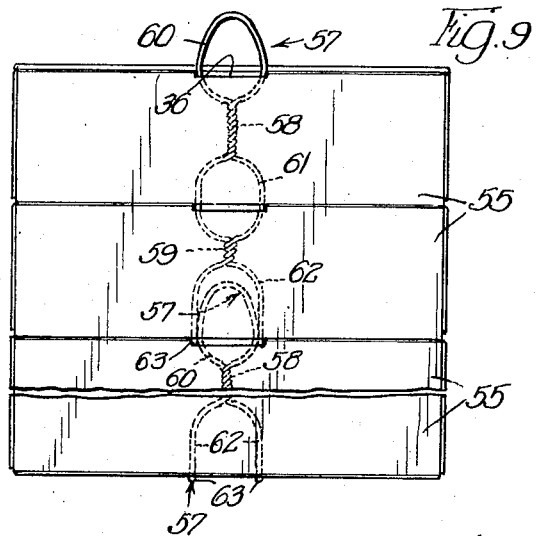
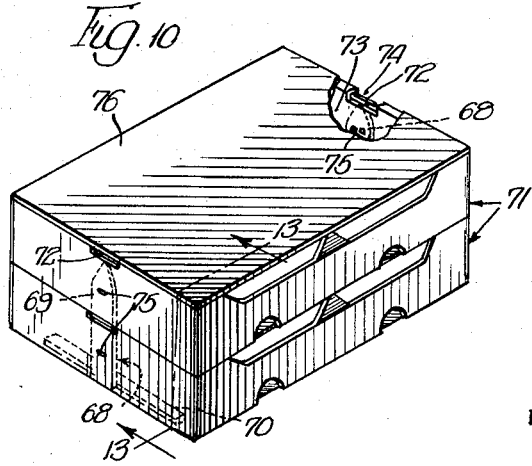
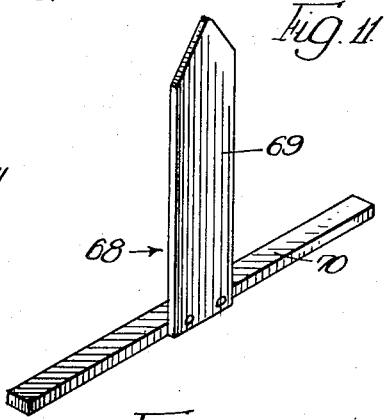
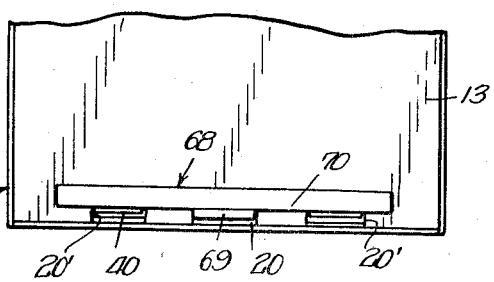
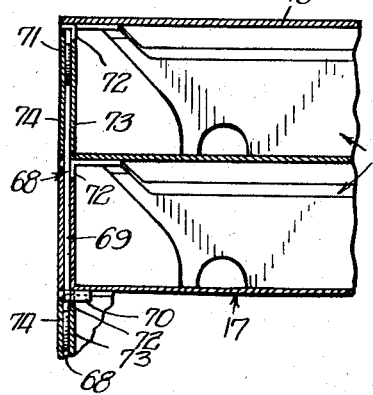
INVENTOR.
Walton B. Crane,
BY Sept. 8, 1959 W. B. CRANE 2,903,176
PAPERBOARD SHIPPING CRATE AND INTERLOCKED CRATE UNIT
Filed May 17, 1956 6 Sheets-Sheet 4
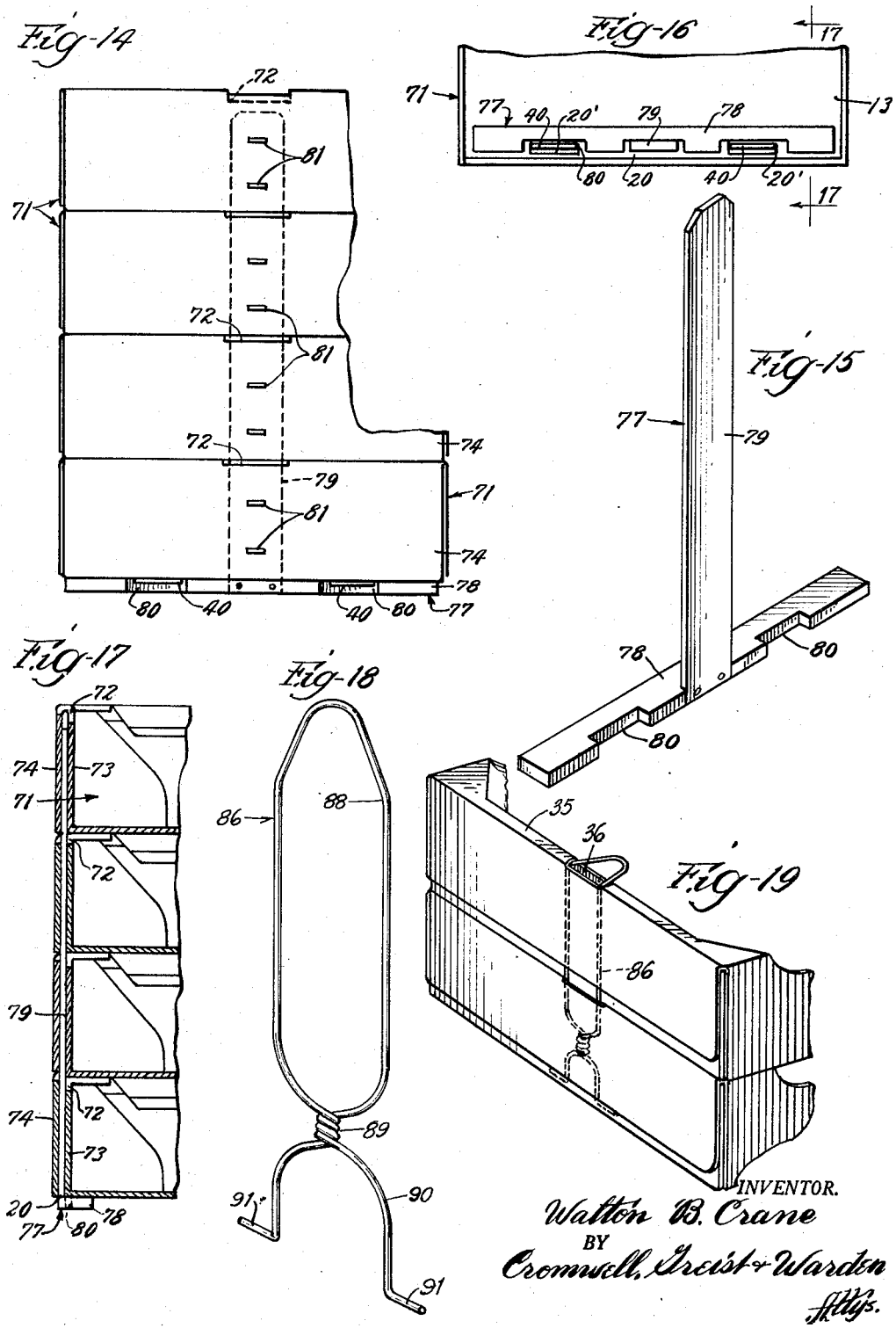

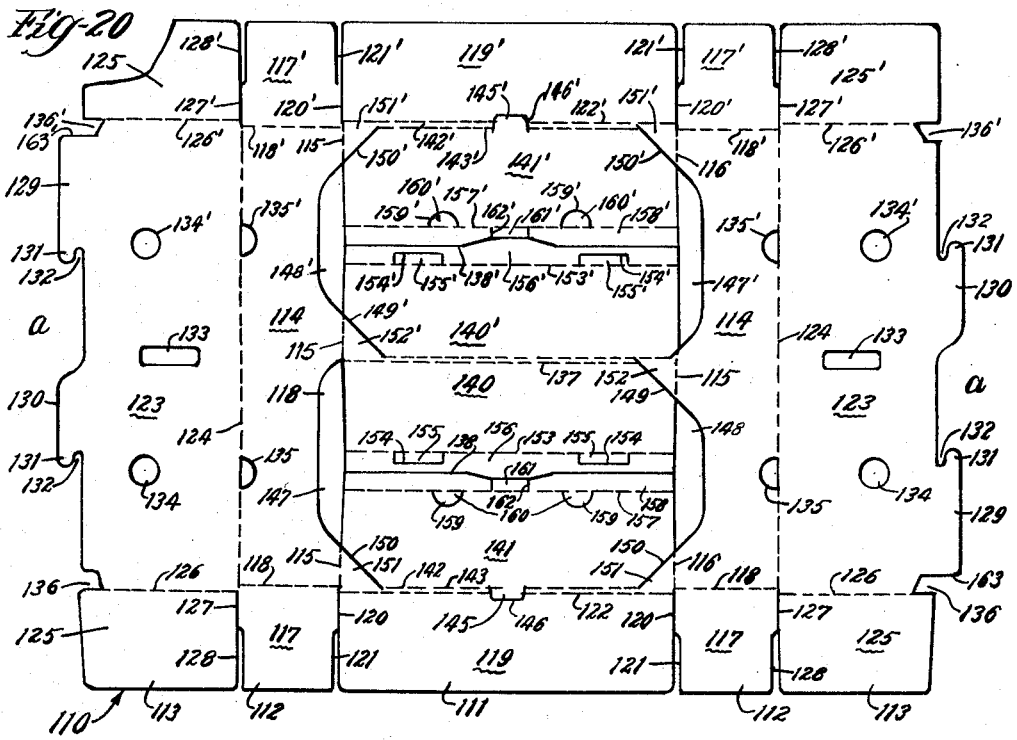

Sept. 8, 1959 W. B. CRANE 2,903,176
PAPERBOARD SHIPPING CRATE AND INTERLOCKED CRATE UNIT
Filed May 17, 1956 6 Sheets-Sheet 6
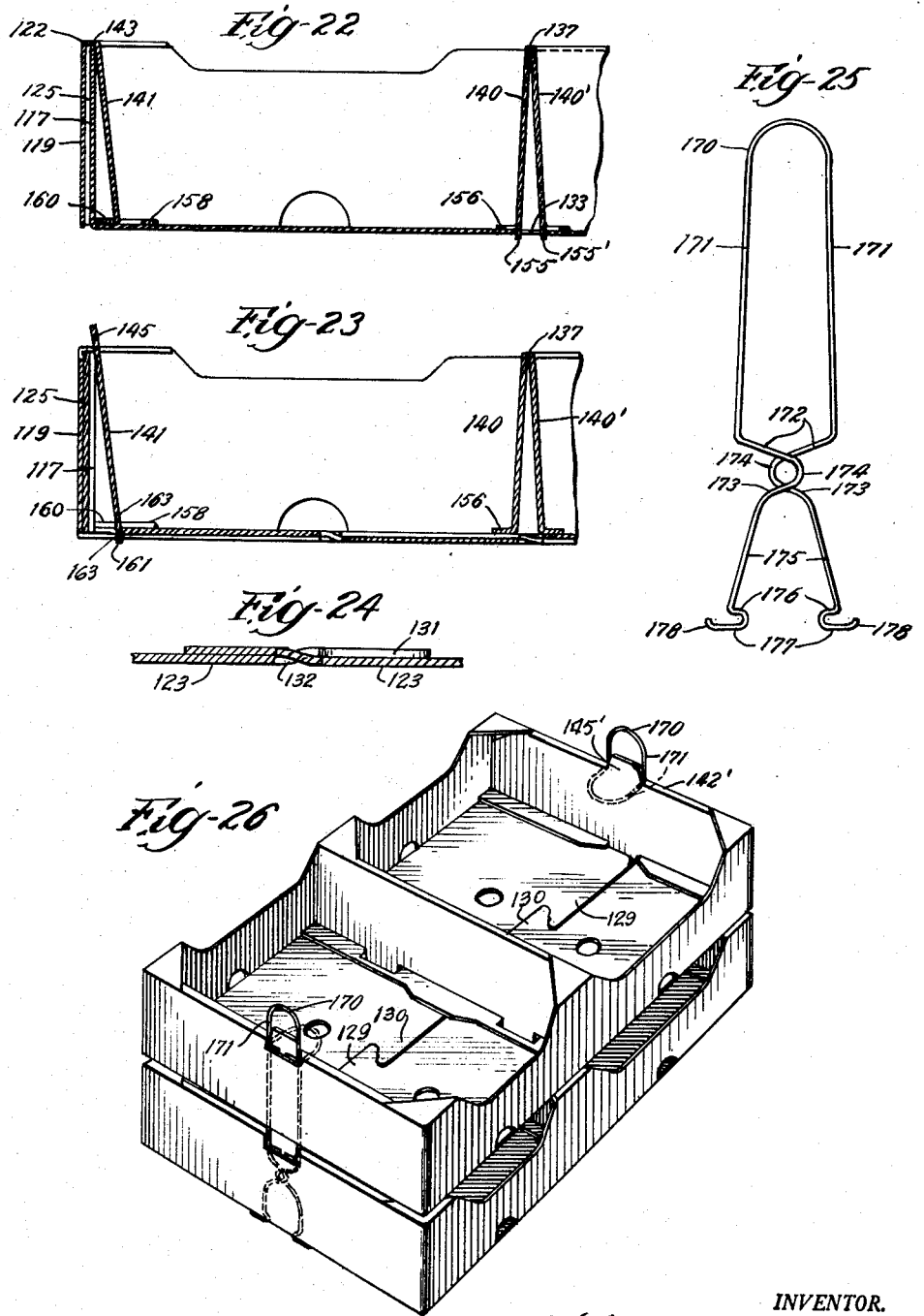
INVENTOR.
Walton B. Crane
BY
Cromwell, Greist & Warden
Attys.

United States Patent Office 2,903,176
Patented Sept. 8, 1959

2,903,176

PAPERBOARD SHIPPING CRATE AND INTER-LOCKED CRATE UNIT

Walton B. Crane, South Pasadena, Calif., assignor to Allied Plastics Company, Los Angeles, Calif., a corporation of California Application May 17, 1956, Serial No. 585,513

10 Claims. (Cl. 229—27)

The present invention relates to improvements in corrugated paperboard crates for shipping fruit, vegetables and other produce, and to different embodiments of a shipping unit composed of a plurality of the improved crates locked together in a compact and stable group by means of novel crate aligning and retaining provisions.

This application is a continuation-in-part of my copending application Serial No. 341,075, filed March 9, 1953, now Patent No. 2,777,627.

With reference to the different forms of individual crates which are embodied in the multiple crate unit, the invention presents improved structural features having the effect of considerably strengthening and reinforcing the same; for example, as compared with generally similar crate constructions which are the subject matter of my copending applications, Serial No. 283,837, filed April 23, 1952, now Patent No. 2,744,675 and Serial No. 291,473, filed June 3, 1952, now abandoned. Insofar as the shipping unit as a whole is concerned, its improved crate registering and locking means impart rigidity and strength to the stacked paperboard crates far out of proportion to the strength and rigidity of the means themselves, so that the completed assembly has all of the advantages of a strapped wooden assembly, plus lighter weight and lower cost of production.

It is a general object of the present invention to provide a shipping crate unit made up of a plurality of improved corrugated board crates which are interlocked in a stacked group and, so interlocked, present a light weight unit having rigidity and strength comparable to that found in a wire bound wooden crate or "lug," but which can be produced at a fraction of the cost of the latter.

Another object of the invention is to provide an improved paperboard shipping crate or container, preferably of moisture-resistant corrugated board construction, which is partially assembled and shipped to the user in a flat, knocked-down condition, the assembly of the crate being finished by the user in simple, manually performed operation. The completed container is characterized, in one form, by a stiff, multiple thickness wall about its entire perimeter, by a unitary, seamless bottom integrally connected to its four walls, and by various reinforcing and locking provisions at those walls and at a transverse internal divider or partition which greatly strengthen and further rigidify the container.

A further object of the invention is to provide a shipping crate or container structure of the type described which is formed from a single blank cut and scored to provide integrally connected, hingedly related top, side wall and bottom wall panels, with integral end wall forming flaps extending in hinged relation therefrom and with cross partition and inner end wall reinforcing flaps cut from the top wall and folded into interlocking engagement with the bottom wall in the erected form of the crate and wherein the bottom wall forming panels are formed with interengaging locking members at their overlapping edges which, in the erected position, have edge portions positioned at opposite ends of the crate in abutting engagement with depending portions of the end wall reinforcing flaps whereby to lock the latter in erected position.

Another object of the invention is to provide a shipping crate or container of the type described wherein the end wall panels have projecting tab means to insure proper space within the multiple panel end walls for reception of the stacking and locking members which hold a number of the containers in a stacked group.

Yet another object is to provide a shipping unit made up of a plurality of the improved containers or crates, which are held in rigid vertically stacked and displacement resisting relation by improved and inexpensive stacking and locking members telescoped through vertically registered walls of the crates, the members being readily and quickly applied and locked to the crates and the crates being positively and securely confined by the locking members in the desired unitary assembly, so as to resist damage in shipment over long distances and under adverse weather and handling conditions.

In all of the embodiments thereof, the invention features a shipping unit as described in the preceding paragraphs in which stacked crates have multiple ply end walls including parallel panels which are in slightly spaced relation to one another and are integrally connected at their tops, the top connecting portions being provided with a slot which is vertically aligned with a corresponding slot in the bottom wall and with the space between the end wall forming panel, and a stack aligning and locking clip or member is positioned in the slots and projects vertically from the end wall of one crate into the end wall of a crate superposed thereon, the wall panels being provided with simple means for maintaining the proper spacing thereof to accommodate this locking member.

Yet another object is to provide improved crate tie means, illustrated in various different practical forms for holding a plurality of crates in compact and rigidly confined order. In certain of the embodiments, such tie means takes the form of a bent wire type clip which is engageable from beneath the lowermost crate of a stack of crates and passes upwardly through the slots and wall spaces referred to in the preceding paragraph, being in stabilizing engagement with the end wall panels of each crate to hold the crates against relative longitudinal or transverse shifting in a horizontal plane, this clip being adapted to be bent over the topmost crate to bind the crates in a compact stack.

The foregoing statements are indicative in a general way of the nature of the invention. Other and more specific objects will be apparent to those skilled in' the art upon a full understanding of the construction and use of the crate and shipping unit.

There are several embodiments of the invention presented herein for purpose of illustration, relating to the improved crate, per se, to the provisions for assembling a plurality thereof in unitary stacked form for shipping, and to the resultant multiple crate shipping unit. It will be appreciated that the invention may be incorporated in other modified forms coming equally within the scope of the appended claims.

In the drawings:

Fig. 1 is a top plan view of a paperboard blank employed in fabricating the improved shipping crate, in one form;

Fig. 2 is a top plan view showing the blank manipulated to form a crate in a flat, knocked-down condition;

Fig. 3 is a view in longitudinal vertical section through the crate on a line corresponding to line 3—3 of Fig. 2, this view showing the crate in an open-sided, tubular condition, partially erected from the form of Fig. 2;

Fig. 4 is a view in vertical transverse section along a line corresponding to line 4—4 of Fig. 3, further illustrating details and relationships of parts when the crate is further locked up;

Fig. 5 is a top perspective view illustrating the improved crate in the finally erected and locked condition of its wall and partition parts;

Fig. 6 is a top perspective view, partially broken away, illustrating a shipping unit composed of a pair of the improved crates assembled and held in a compact rigid assembly;

Fig. 7 is a perspective view of a lid or cover member which may be employed as an element of the unit of Fig. 6;

Fig. 8 is a perspective view of a crate aligning and locking device associated with the unit of Fig. 6;

Fig. 9 is a view in end elevation illustrating the manner in which more than one pair of crates may be associated as a unit in accordance with the invention;

Fig. 10 is a top perspective view, partially broken away, showing an adaptation of the invention employing a modified embodiment of aligning and locking device for a pair of stacked crates, also indicating a slight modification in the crate structure employed in this particular unit;

Fig. 11 is a perspective view of a rigid wooden aligning and locking device associated with the unit of Fig. 10;

Fig. 12 is a fragmentary bottom plan view of the unit of Fig. 10, showing the relationship of the lowermost crate thereof to the aligning and locking member;

Fig. 13 is a fragmentary view in longitudinal vertical section along a line corresponding to line 13—13 of Fig. 10, further illustrating the manner in which more than a single pair of stacked crates may be compactly assembled in a larger stack, if desired;

Fig. 14 is an end elevational view of a still further modified adaptation of the invention, generally similar to form of Figs. 10 to 13, but relating to the stacking and locking of four crates in a unitary group;

Fig. 15 is a perspective view illustrating a modified type of rigid wooden stacking member or device employed in the unit of Fig. 14;

Fig. 16 is a fragmentary bottom plan view of the last named unit;

Fig. 17 is a fragmentary view in longitudinal vertical section along a line corresponding to line 17—17 of Fig. 16;

Fig. 18 is a perspective view to an enlarged scale illustrating a modified form of wire stacking and locking tie or clip which may be used to hold a plurality of the crates in stacked relation;

Fig. 19 is a fragmentary top perspective view of one end of a shipping unit comprising a pair of crates held in assembled relation by the wire tie or clip of Fig. 18;

Fig. 20 is a top plan view with portions broken away of a paperboard blank employed in fabricating a further modified embodiment of the container;

Fig. 21 is a top plan view of a container formed from the blank of Fig. 20 and in partially set up condition;

Figs. 22, 23 and 24 are, respectively, fragmentary sectional views, to an enlarged scale, of the container of Fig. 21, taken along the lines 22—22, 23—23 and 24—24 of Fig. 21;

Fig. 25 is a view illustrating, in still further enlarged scale, an adaptation of a wire stacking and locking tie clip which may be used to hold crates as shown in any of the figures in stacked relation; and Fig. 26 is a top perspective view of a stack of the crates shown in Figs. 20 to 24, held in such relation.

Fig. 1 of the drawings illustrates a flat paperboard blank 10, preferably of corrugated board stock suitably treated to resist moisture, which is died out in an elongated, generally rectangular outline. Blank 10, viewed as in Fig. 1, consists of the right hand wall and bottom forming section 11 and a left hand wall and partition forming section 12.

Section 11 comprises a rectangular bottom forming panel 13 outlined by opposed pairs of longitudinal and transverse creases 14, 15, respectively. Panel 13 is provided on either side of the longitudinal center line thereof with pairs of transversely spaced, transversely elongated partition latching slots 16, and it is also provided with a number of ventilating openings designated 17. Inner side wall panels 18 are integrally hinged to panel 13 by side margin forming creases 14 of the latter, and further ventilating apertures 17' are formed in wall panels 18 adjacent creases 14.

An end wall securing flap 19 of transversely elongated, rectangular shape is integrally hinged to the right hand end of bottom panel 13 by one of the creases 15, and a medial, transversely elongated crate registering slot 20 is formed in panel 13 just inwardly of that crease. Slot 20 is flanked by two similarly shaped end wall latching slots 20', similarly located with reference to crease 15. An outer end wall panel 21 of rectangular outline is similarly hinged integrally to the opposite end marginal crease 15 of panel 13, the latter also being provided adjacent this end with slots 20, 20' similar to those at the opposite end thereof. End wall sealing flaps 22, which are adapted to be disposed internally of the completed and erected container, are integrally hinged to opposite ends of panel 21 by means of longitudinal creases 23 paralleling creases 14, but located slightly inwardly thereof in the transverse sense. Transverse slits 24 separate flaps 22 from inner side wall panels 18.

Partition and wall forming section 12 is integrally hinged to end wall panel 21 of section 11 by means of a transverse crease 25. It comprises a pair of opposed outer side wall forming panels 26 integrally hinged to panel 21 by means of a pair of triangular webs 27. These are outlined by short longitudinal creases 28 almost aligned with but offset slightly inwardly of the creases 23, and by short transverse creases 29 which are, in effect, side extensions of crease 25.

The reference numeral 30 generally designates an inner end wall and partititon forming panel unit made up of a set of slit-freed panel sections, as follows: At the right hand of panel unit 30, as viewed in Fig. 1, there is a generally rectangular inner end wall panel 31; this is separated from outer side wall panels 26 and from triangular webs 27 by an elongated, longitudinally extending opening 32 at each side margin of panel unit 30 and by a 45° slit 33 leading from those openings to creases 25. A transverse hinge crease 34 paralleling and closely adjacent crease 25 coacts with the latter in defining a double creased end wall hinge 35 which coincides with the top of an end wall of the completed carrier. A transversely elongated slot 36, longitudinally aligned with the centermost slots 20 of blank section 11, is provided for the purpose of receiving a stack alignment and locking member, to be described.

Inner end wall panel 31 is separated by a transversely extending shaped slit 37 from a swingable partition forming panel 38. Slit 37 includes two small, inverted U-shaped portions 39 defining transversely spaced locking feet 40 on panel 31, these feet are longitudinally aligned with the respective locking slots 20' in blank section 11.

A second set of partition and end wall forming panels, hinged by a transverse medial crease 41 to the set just described, is provided in unit 30 by slitting and creasing the same in exactly the same manner referred to above. In other words, unit 30 is symmetric in shape, and correspondingly treated, on opposite sides of crease 41. Hence corresponding parts, provisions and relationships are designated by corresponding reference numerals, primed, and further description is dispensed with. Partition forming panels 38, 38' are integrally hinged to one another by crease 41 and, moreover, are integrally connected to the respective side wall panels 26 by means of angularly creased gusset sections 42 at each end of the crease. Sections 43 form well braced struts connecting the partition formed by panels 38, 38' to the side walls when the crate is completed and erected. Details in this regard are illustrated and described in my copending applications referred to above, hence are not further enlarged on herein.

Panels 38, 38' at the free swinging ends thereof adjoining the respective slits 37, 37', are provided with a series of transversely extending creases 43, 43' interrupted by U-shaped slits to define bottom locking feet 44, 44' for the respective transverse partition panels, similar to feet 40, 40' on panels 31, 31', respectively. Friction holding flaps 45, 45' lie between creases 43, 43' and the respective transverse slits 39, 39' which free the partition panels and inner end wall panels from one another.

Left hand inner end wall panel 31' of unit 30 is connected by a transverse hinge crease 46, similar to crease 25, with an outer end wall forming panel 47. End wall panel 47 has end flaps 48 integrally hinged to opposite ends thereof by short longitudinal creases 49 aligned with creases 23, and flaps 48 are separated from side wall panels 26 by transverse slits 50 aligned with crease 46.

The crate is initially fabricated in flat, knocked-down position as illustrated in Fig. 2. The bottom securing flap 19 at the right hand end of blank 10 (Fig. 1) is first folded upwardly, inwardly and downwardly about adjoining crease 51 to the position illustrated in dotted lines in Fig. 1, whereupon wall and partition forming section 12 is folded as a unit upwardly and inwardly and downwardly about double crease 35. End wall panel 47 is then secured, as by staples or stitches 51, to flap 20, leaving the container in the flat form shown in Fig. 2. It is shipped in this condition to the ultimate user.

In completing the crate to its erected condition, the flat article is expanded by a compressive force applied to its opposite end margins, represented by end wall hinges 35 and 35'. The container is thus brought to rectangular outline. Inner end wall panels 31, 31' may now be swung downwardly about their respective double creases 35, 35' into 90° relation to bottom panel 13 and the locking feet 40, 40' thereon snapped into bottom locking slots 20'. This leaves the carton in a partially erected, tubular condition illustrated in Fig. 3. Partition panels 38, 38' may next be similarly swung down about crease 41 and their locking feet 44, 44' snapped into bottom slots 16, the flaps 45, 45' trailing and wedging with bottom 13; however, it is desirable to delay this pending completion of the side wall structures of the crate.

To set up the side walls, the sets of end wall flaps 22, 48 are swung inwardly to 90° relation to end wall panels 21, 47, respectively, after which inner side wall panels 18 are swung upwardly about creases 14 to 90° relation to bottom panel 13, externally overlying flaps 22, 48. Outer side wall panels 26 are then swung downwardly 90° to side by side engagement with panels 18. With the walls and flaps manipulated as described, they are held together by staples or stitches (see Fig. 5) thereby completing the wall structure of the shipping crate, which is generally designated by the reference numeral 55. Partition panels 38, 38 are swung downwardly in opposite directions about their connecting crease 41 and engaged with bottom panel 13, as indicated above, completing the crate (Fig. 5). The flexible flaps 45, 45' on the lower end of panels 38, 38' wipe along bottom 13 as panels 38, 38' are manipulated as described, and act as friction members tending to resist inadvertent displacement of panels 38, 38' from locked position.

The set up carton presents multiple side wall and end wall thicknesses, all substantially reinforced by the lateral and vertical strut action of the center partition. A strong unseamed bottom also adds to the strength of the crate. Upwardly opening slots 36, 36' in the tops of the end walls coact with similar vertically aligned slots 20 at the ends of bottom panel 13 in locking a plurality of the crates 55 together, in a fashion illustrated in Figs. 6, 7, 8 and 9 of the drawings.

Referring first to Fig. 8, a locking member 57, in accordance with one embodiment presented herein, consists of a single elongated length of relatively rigid wire which is first bent in U-shape and the legs successively twisted and/or welded together at 58 and 59 to stiffen the same and to provide upper and intermediate crate aligning and stabilizing loops 60, 61. The lower leg portions 62 of the wire are formed to provide a bottom bight of inverted U-shape with the terminal ends bent at 90° to the plane of the loops 60, 61 and bight 62 to afford feet 63. These are engageable beneath the bottom of a lowermost crate 55 of a two-crate stacked unit generally designated 64 in Fig. 6. Crate unit 64 may also include a relatively rigid, corrugated board top closure panel 65 of rectangular outline (Fig. 7) provided with lock accommodating recesses 66 in opposite ends thereof.

In assembling unit 64, one of the wire locking members 57 is inserted upwardly in each of the centermost slots 20 at opposite end margins of the lowermost crate bottom panel 13, the feet 63 underlying the panel. The legs of bight 62 take firm, stable engagement with the ends of slot 20 and between the inner and outer wall end wall panels, i.e., between panels 31, 47 at one end and panels 21, 31 at the opposite end. Loops 61 extend upwardly through the top end wall slots 36, 36' respectively, engaging the ends of the latter. When the second crate 55 is slipped over the upstanding members 57, half of the respective loops 61 engage in its end bottom slots 20 and the top loops 60 extend upward through its top end wall, thus registering the two stacked crates 55 in vertically aligned relation. Cover panel 65 is now applied, as illustrated in Fig. 6, and loops 60 are bent 90° inwardly and clamped against the same, completing the shipping unit 64. The latter has good longitudinal, lateral and vertical stability, with no need for further wire or other binding provisions, staples, and the like, commonly employed in assembling wooden shipping crates. Members 57 hold the crates securely in place and also function as a quickly usable cover locking device. The contents of the crate unit are well ventilated by apertures in the walls and bottom of the crate, insuring proper circulation of air therein. Units of this sort are prepared for shipment at a fraction of the cost of wooden units.

In the event it is desired to assemble a greater number of crates in a larger unit, as shown in Fig. 9, the upper loop 60 of the locking member 57 of a two crate unit is left upright, the loop 60 then entering into the space between bight legs 62 of a unit thereabove. This registers the compounded units longitudinally and laterally, in the same manner as the crates 55 of an individual crate unit 64 are registered. The uppermost crate may be closed by a cover panel similar to that illustrated in Fig. 7, clamped in place by bending over the uppermost loop 60.

A modified crate unit is illustrated in Figs. 10–13 inclusive of the drawings; this employs a wooden crate aligning and locking member such as is shown in Fig. 11 and generally designated by the reference numeral 68. Member 68 is of inverted T-shape including a relatively wide and flat upstanding stake 69, pointed at its end, and a transverse bottom cleat 70, to the outer edge of which element 69 is centrally secured, as by nails. In employing lock member 68 it is desirable to make a slight modification in the crate, hence the latter is specially designated 71 in Figs. 10, 12 and 13. This change simply involves an increase in depth of a side of each of the slots 72 formed at the top of the end walls of the crate, which are formed by inner and outer panels 73, 74. The slots are extended downwardly further in inner end wall panel 73, as illustrated clearly in Figs. 10 and 13.

Locking members 68 are applied to a bottom crate 71 in the fashion shown in Fig. 12, the transverse cleats 70 being disposed inwardly to clear the inner end wall locking feet 40, 40' and the upstanding stakes 69 passing upwardly through the center slot 20 in bottom panel 13 and through the respective slots 72 of the end walls. The crate end walls are then secured to stakes 69 by staples 75. Another crate 71 is now slipped downwardly over the upper portion of the thus inserted stake, and is similarly secured thereto, whereby the two crates are properly registered in longitudinal and lateral relation by engagement of stake 69 in the various slots 20, 72.

In the event that it is desired to secure more than two crates in stacked relation, as illustrated in Fig. 13 of the drawings, the downward enlarging of slot 72 accommodates the bottom or heel portion of stake 69, at which it is secured to cleat 70, preventing interference of this heel portion with the crate immediately therebeneath. A corrugated board cover panel or lid 76 may be stapled or wire banded to the top crate of any unit.

A still further modified embodiment in a four crate shipping unit is illustrated in Figs. 14–17 of the drawings. In this embodiment, wooden locking member 77 (Fig. 15) is also of inverted T-shaped outline, comprising a transverse cleat 78 which is centrally recessed along one edge to receive an elongated upstanding stake member 79 in flush relation to that edge. Because of this flush relation, the edge referred to is further slotted at 80 on either side of its center point to accommodate the depending locking feet 40 or 40' of the inner end wall panel of the bottom crate 71 of a stack. Stake 79 is of sufficient height to extend upwardly almost the entire height of the assembly of four crates, which are successively secured thereto by staples or stitches 81 as the stack is built up. A lid or cover may be applied, as in the form of Figs. 10–13. Member 78 holds a stack of four crates, which is as many as are ordinarily desired in a produce shipping unit, in laterally and longitudinally correct, rigid register, as described in connection with the embodiment of Figs. 10–13.

Another form of locking or tie clip member is illustrated in Figs. 18 and 19 which is designated generally by the numeral 86. Tie members 86 are, like the clips 56 shown in Fig. 8, fabricated of flexible wire stock. However, in this form, they are bent to provide a single, vertically elongated upper loop 88 and a connecting welded or twisted portion 89 which joins the loop 88 to a lower leg portion 90 of inverted U-shape outline. The terminal ends of legs 90 are bent outwardly in the plane of the clip at 91 to horizontal, transversely aligned position.

The wire clips or tie members 86 are assembled with a stack of the crates as illustrated in Fig. 19. In assembling the wire tie clips 86 with the crates they are inserted upwardly through the apertures at opposite ends of the lowermost crate bottom. Each clip loop 88 passes upwardly through the space between the inner and outer end wall panels of the multiple panel end wall structure through slot 36 at the top hinge zone 35, and through the corresponding aperture and slot in a crate which is superposed thereabove. The clips 86 engage the ends and sides of the openings to preserve lateral and longitudinal register of the stacked crates, as described with reference to preceding forms and as illustrated in Fig. 19.

The upper ends of loops 88 project above the end walls of the topmost crate and may be deflected inwardly as shown in Fig. 19 to register the crates in a vertically aligned, neatly stacked unit, which is held in this unitary relationship without likelihood of relative longitudinal or lateral horizontal shifting, or vertical displacement. If desired, a cover may be applied to the topmost crate of the unit and held thereto by the inturned ends of loops 88, in the same manner as in Fig. 10 of the drawings.

A still further embodiment of the crate and the stacked crate unit is illustrated in Figs. 20 to 26, in which the bottom wall comprises two panels integrally hinged to the bottom edges of the side wall panels and held in horizontal position between the side walls without the use of any staples, the bottom wall panels being provided with interlocking marginal portions which also engage with downwardly projecting portions of the innermost end wall panels of multiple panel end wall structures and lock the same against movement out of position within the crate.

This form of the container is fabricated from a single blank of generally rectangular shape which is cut and scored as illustrated in Fig. 20. The cut and scored blank 110 is symmetric, except for certain panel locking provisions which will be described, about a horizontal, longitudinally extending medial line a—a. Accordingly, for simplicity corresponding reference numerals will be employed to designate corresponding parts and/or relationships on opposite sides of the medial line a—a. The locking members for the bottom forming panels are not symmetric about the medial line a—a but corresponding members are arranged in diagonally opposite relation at opposite ends of the blank in a manner which will be described in detail.

The blank 110 is divided by longitudinally spaced transversely extending lines into a central partition and end wall forming section 111, adjoining side and end wall forming sections 112 and bottom and end wall forming sections 113.

The sections 112 of the blank include side wall panels 114 which are separated from the central partition and end wall forming section 111 by two series of transversely aligned short hinge creases 115 and 116. The side wall panels 114 are provided at their opposite ends with end wall forming flaps 117, 117' which are separated therefrom by longitudinally extending hinge creases 118, 118'. The end wall flaps 117, 117' are separated from adjoining outer end wall forming panels 119, 119' on the section 111 by the transversely extending cutting lines 120, 120' with the latter being in transverse alignment with the crease lines 115 and 116 and with the end wall panels 117, 117' having a cut out side portion at 121, 121'. The outer end wall panels 119, 119' are separated from the central or remaining portion of section 111 by longitudinally extending crease lines 122, 122' which are spaced outwardly slightly of the longitudinally extending crease lines 118, 118'.

The bottom wall forming sections 113 at opposite ends of the blank 110 include bottom wall forming panels 123 which are separated from the adjoining side wall forming panels 114 by transversely extending score lines 124 and the bottom wall forming panels 123 are each provided with end wall forming flaps 125, 125' at opposite sides thereof which end wall flaps 125, 125' are separated from the bottom wall forming panels 123 by longitudinally extending crease lines 126, 126', the latter being offset outwardly relative to the longitudinal crease lines 118, 118'. The end wall forming flaps 125, 125' are separated from the adjoining end wall forming flaps 117, 117' by cutting lines 127, 127', and the adjoining edge portion of each flap 117, 117' is cut away at 128, 128'. Each bottom wall panel 123 is provided along its outer free edge with a pair of locking tongue formations 129 and 130 which are spaced transversely and project in the longitudinal direction of the blank with the respective tongues on each panel 123 being diagonally opposite the corresponding tongue on the other panel 123 and having identical end locking tabs 131 which are separated from the panels 123 by a locking slot 132 and which face in the same direction with the tabs at opposite ends of the blank facing oppositely relative to the end wall forming flaps 125. Each of the bottom wall forming panels 123 is also provided with a generally rectangular partition latching slot 133 straddling the medial line a—a. These slots extend in parallelism with the line a—a and are so located that they are in transversely spaced relation when the container is set up. Ventilating openings 134 are formed in the body of the bottom wall forming panels 123 and similar semi-circular openings 135 for the same purpose are formed in the side wall panels 114 along the crease lines 124. The bottom wall forming panels 123 are cut out at 136, 136' at the outer ends of the crease lines 126, 126' to form, when the panels 123 have their free edges overlapped and interlocked, wire tie receiving apertures.

The central partition and end wall forming section 111 of the blank 110 is subdivided by the double crease lines 137 which extend longitudinally of the blank and straddle the medial line a—a. The panel sections on opposite sides of the crease line 137 are further divided by longitudinally extending slitting lines 138, 138' which are parallel and spaced transversely on either side of the medial crease line 137 approximately the same distance from the crease lines 137 and 122, 122'. Slits 138, 138' define the free edges of flap bearing cross partition panels 140, 140' and inner end wall forming panels 141, 141'. The cross partition panels 140, 140' are integrally hinged to one another by the medial crease line 137 while the inner end wall forming panels 141, 141' are integrally connected to the adjoining outer end wall forming panels 119, 119' by relatively narrow longitudinally extending top wall forming sections 142, 142' and longitudinally extending crease lines 143, 143'. The top wall sections 142, 142' extend between the inner and outer crease lines 143, 143' and 122, 122'. Tab formations 145, 145' are provided on the edge of the inner end wall panels 141, 141' by generally U-shaped cutting lines 146, 146' in the center of the top wall sections 142, 142' which have their legs terminating at the inner crease lines 143, 143' and which extend slightly into the adjoining outer end wall forming panel. The cross partition panels 140, 140' and the inner end wall panels 141, 141' are separated from the side wall panels 114 by elongate slots 147, 147' and 148, 148' extending into the side wall panels and by diagonally extending slits 149, 149' and 150, 150', the slits 150, 150' extending from the outer ends of the slots 147, 147' and 148, 148' to the inner crease lines 143, 143' of the panels 141, 141' while the slits 149, 149' extend from the inner ends of slots 147, 147' to the medial crease line 137. The slots 147, 148 and the splits 149, 150 are so arranged that they free the ends of the panels 140 and 141 for hinging movement about the crease lines 137 and 143. This leaves the outer end wall panels 119, 119' connected at their opposite ends to the side wall panels 114 by the triangular connecting web formations 151, 151'. The slits 149, 149' are on diagonally opposite sides of the medial crease line 137 and at opposite ends of the latter so that each cross partition panel 140, 140' is connected to the top edge of a side wall panel 114 by a triangular web formation 152, 152'. Each cross partition forming panel 140, 140' is provided inwardly of its edge defining slit 138, 138' with a longitudinally extending cut score or crease line 153, 153' and a pair of longitudinally spaced U-shaped slits 154, 154', whose legs terminate at crease lines 153, 153' and outline partition locking feet or lugs 155, 155' as integral extensions of the respective cross partition panels 140, 140'. The marginal edge sections between the slits 138 and 138' and the crease lines 153, 153' constitute bendable friction locking flaps 156, 156' on the free ends of the panels 140, 140'. The inner end wall forming panels 141, 141' are provided at the inner edges defined by the slits 138, 138' with longitudinally extending cut score or crease lines 157, 157' which are spaced outwardly of slits 138, 138' and are generally parallel therewith. The crease lines 157, 157' define bendable friction locking flaps 158, 158' on the free ends of the panels 141, 141' and these score lines are each interrupted by a pair of laterally spaced arcuate outwardly convex slits 159, 159'. The slits 159, 159' define outwardly projecting end wall panel spacing tongues 160, 160' which are hereinafter referred to.

Each of the inner end wall forming panels 141, 141' is provided on its inner edge with an extension locking tongue 161, 161', each formed by a generally U-shaped slit 162, 162' having the bight in an outwardly offset portion of the slit line 138, 138' and the legs terminating at the crease line 157, 157'.

In setting up the container or crate the cut and scored blank 110 is folded into tubular form by hinging the side wall panels 114 about the crease lines 115, 116 and the bottom wall panels 123 about the crease lines 124 to bring the locking tongues 129, 130 on the free edges thereof into overlapping relation with marginal portions of the panels 123 and interlocking the same by interengaging the tabs 131 and slots 132 on the respective pairs of tongues 129, 130. The end wall forming flaps 117, 117' on the side wall panels 114 are then folded inwardly about the hinge lines 118, 118' and the end wall flaps 125, 125' on the bottom wall forming panels 123 are thereafter folded into upstanding relation about the score lines 126, 126'. The flaps 117, 117' preferably have an adhesive applied to their bottom faces so that they are adhesively secured to the inner surfaces of the end wall flaps 125, 125'. The outer end wall flaps 119, 119' are folded about the hinge lines 122, 122' against the end flaps 125, 125' with an adhesive being applied between the same to adhere the interengaging faces to each other. Thereafter the inner end wall panels 141, 141' are folded downwardly about the hinge forming score lines 143, 143' to bring the end flaps 158, 158' thereon into frictional engagement with the bottom wall panels 123, the locking tongues 161, 161' being inserted in the openings in the bottom which are formed by the slots 136, 136' in the panels 123, and the spacing tongues 160, 160' extending in a plane parallel to and above the plane of the bottom wall and into edge engagement with the other panels forming the end wall structures, thereby spacing the inner panels 141, 141' inwardly of the next adjacent flap members 117, 117' and providing a vertically extending compartment or passageway at each end of the crate for accommodating a wire tie member. The set up of the crate is completed by folding the cross partition forming panels 140, 140' downwardly about their medial crease line 137 to engage the marginal flaps 156, 156' with the bottom panels 123 and to insert the locking tongues 155, 155' into the slots 133, the latter being of sufficient width to allow the cross partition panels 140, 140' to form an inverted V-shaped cross strut arrangement. In folding the inner end wall panels 141, 141' into their downwardly extending vertical position the locking tongues 161, 161' are engaged in the slots in the bottom wall panels and form vertical downward extensions on the panels 141, 141' against which the outer end edges 163 of the bottom locking members 129 abut so that the latter serve to lock the inner end wall panels 141, 141' in their vertical position.

In their set up condition a plurality of the crates may be arranged in superimposed relation and tied together for handling by the wire ties 170 illustrated in Fig. 25. Tie members 170 are fabricated of flexible wire stock and are bent to provide a single vertically elongated upper loop 171 with lower leg portions bent inwardly at 172 and then outwardly at 173 with the inner portions 174 overlapping and welded or otherwise secured together and the lower ends of the legs being shaped in the form of an inverted U-shaped outline. The lower leg portions 175 are each bent inwardly at 176 and then outwardly at 177 in the plane of the body of the member to provide horizontal transversely aligned feet forming portions, each of which terminates in an upwardly bent short end 178.

A stack of the crates tied together by the wires 170 are illustrated in Fig. 26. In assembling the crates with the wire ties 170, the latter are inserted upwardly through the end apertures in the lowermost crate bottom which are outlined by the coacting notches 136 in the overlapped bottom forming panels 123. The tie loop 171 passes upwardly through the space between the inner and outer end wall panels 141, 141' and 119, 119', through the slot defined by the U-shaped cutting lines 162, 162' in the top hinge zones 142, 142', and through the corresponding apertures and slots in a crate which is superimposed thereabove. The clips 170 engage the end and side edges defining these openings to preserve lateral and longitudinal register of the stacked crates as described with reference to preceding forms thereof. The upper ends of loops 171 project above the end walls of the topmost crate and may be deflected inwardly as indicated in dotted line in Fig. 26 to arrange the crates in a vertically aligned neatly stacked unit, which is held in this unitary relationship without relative longitudinal or lateral horizontal shifting or vertical displacement. If desired, a cover may be applied to the topmost crate of the unit and held thereon by the inturned ends of the loops 171 in the same manner as in Fig. 10 of the drawings. The reversely bent looped portions 176 of each of the ties 170 straddle the edges of the material at the ends of the tie receiving openings 136 and the lower ends 178 dig into the bottom surfaces of the bottom wall panels 123 preventing displacement of the ties 170 relative to the crates after they are once inserted.

I claim:

1. A tray-like shipping container formed from a single blank of bendable material which is cut and scored to provide, when erected, a top wall forming panel, depending side and end wall forming panels hinged thereto, bottom wall forming panels hinged to the bottom edges of said side wall forming panels and end wall forming flaps hinged to the ends of said side and bottom wall forming panels, said bottom wall forming panels having overlapping portions at their inner marginal edges which are provided with interlocking tab formations to secure said bottom wall panels in bottom forming relation between said side wall panels, cross partition forming panels and inner end wall reinforcing panels cut from said top wall forming panel and folded downwardly about top hinge lines into generally vertical position, said bottom wall panels having slots at opposite ends of the crate, said inner end wall reinforcing panels having locking tabs depending from the free edges and in the plane of the body thereof for insertion in said bottom wall slots and the overlapping portions of said bottom wall panels having outer end edge portions which partially define said bottom wall slots in abutting engagement with the inner faces of said depending locking tabs whereby to lock said inner end wall panels in their erected position.

2. A tray-like shipping container formed from a single blank of bendable material which is cut and scored to provide, when erected, a top wall forming panel, depending side and outer end wall forming panels hinged thereto, bottom wall forming panels hinged to the bottom edges of said side wall forming panels and upstanding end wall forming flaps hinged to said bottom wall forming panels, said bottom wall forming panels having interengaging locking tab formations at their inner marginal edges to lock said bottom wall panels in bottom forming relation between said side wall panels, inner end wall reinforcing panels cut from said top wall forming panel and folded downwardly about top hinge lines at the ends of the container into generally vertical spaced relation to said outer end wall forming panels, said bottom wall panels having slots at opposite ends of the crate, said inner end wall reinforcing panels having marginal flaps hinged inwardly in frictional engagement with the bottom wall and integral spacing tongues extending outwardly at the hinge line of said marginal flaps in a horizontal plane above said bottom wall and in edge engagement with the adjacent end wall panels, locking tabs depending from the bottom edge of said end reinforcing panels in the plane of the body thereof and projecting into said bottom wall slots, the inner ends of said bottom wall panels having cut away portions providing an end edge which is positioned in abutting engagement with the inner faces of said depending locking tabs whereby to lock said inner end wall panels in their erected position.

3. A tray-like shipping container formed from a bendable blank material which is cut and scored to provide, when set up, a top wall, cross partition and end wall reinforcing panel forming sections, depending side and outer end wall forming panels hinged to the side and end edges thereof, bottom wall forming panels hinged to the bottom edges of said side wall forming panels and having upstanding end wall forming flaps positioned inwardly of said outer end wall panels, said bottom wall forming panels having inner marginal edges to provide pairs of cooperating locking tongues with the respective tongues of each pair facing towards opposite ends of the container and interengaging in locking relation upon movement toward each other, inner end wall reinforcing panels cut from said top wall forming section and folded downwardly about hinge lines at the ends of the container into generally vertical position, said bottom wall panels having slots at opposite ends of the container, said inner end wall reinforcing panels having locking tabs depending from the bottom edges and in the plane of the body thereof for insertion in said bottom wall slots and said bottom wall panels having end edge portions in abutting engagement with the inner faces of said depending locking tabs whereby to lock said inner end wall panels in their erected position and to hold the locking tongues on the inner edges of said bottom wall panels against disengagement.

4. A tray-like shipping container formed from a blank of bendable paperboard material which is cut and scored to provide when erected a top wall forming panel, depending side and end wall forming panels hinged thereto, bottom wall forming panels hinged to the bottom edges of said side wall forming panels and upstanding end wall forming flaps on said bottom wall panels, said bottom wall forming panels having cut out portions and locking slits at their inner marginal edges which are adapted to interengage upon overlapping and relative movement of the edge portions of the bottom wall panels in the lengthwise direction of the container to secure said bottom wall panels in bottom forming relation between said side wall panels, inner end wall reinforcing panels cut from said top wall forming panel and folded downwardly and outwardly about top hinge lines adjacent the ends of the container into generally vertical position, said bottom wall panels having cross slots at opposite ends of the container, said inner end wall reinforcing panels having locking tongues depending from the bottom edges and in the plane of the body thereof for insertion in said bottom cross slots and the overlapping edge portions of said bottom wall panels having their ends cut to provide an end edge for positioning in abutting engagement with the inner faces of said depending locking tongues whereby to lock said inner end wall panels in their erected position and to prevent disengagement of the overlapping edge portions of said bottom wall panels.

5. In a multiple crate shipping unit wherein a plurality of like rectangular paperboard crates of open topped, tray-like construction are assembled in vertically aligned, stacked relation, which crates each have a bottom, opposed side walls and opposed end walls connected to one another with said end walls each comprising a pair of end wall panels connected to one another on spaced hinge lines extending along a relatively narrow top marginal end portion and provided with a slot through said top end portion, and with said bottom having the end slots vertically aligned with said top slots; the improvement which comprises vertically extending crate tie members telescoped through the vertically aligned slots of said stacked crates, said tie members each comprising a wire element formed to provide a relatively wide upstanding stabilizing part positioned between the panels of the end wall and engaging the ends of the slots in the crates to hold the crates in vertical register, said wire tie element having a bottom portion which is shaped to provide oppositely directed spaced legs in the plane of the upstanding stabilizing part, and said legs having reversely bent bottom end portions which are adapted to straddle edge portions of the material in the bottom at the ends of the bottom end slot in the lowermost crate of the stack, thereby to position the bottom ends of said legs beneath the lower crate of the stack and in supporting engagement with the bottom thereof.

6. In a multiple crate shipping unit wherein a plurality of like rectangular paper board crates of open topped, tray-like construction are assembled in vertically aligned, stacked relation, which crates each have a bottom, opposed side walls and opposed end walls connected to one another, with said end walls each comprising a pair of end wall panels connected to one another on spaced hinge lines extending along a relatively narrow top marginal end portion and provided with a slot through said top end portion, and with said bottom having the end slots vertically aligned with said top slots; the improvement which comprises vertically extending crate tie members telescoped through the vertically aligned slots of said stacked crates, said tie members each comprising a looped wire element having a relatively wide upstanding stabilizing part formed by laterally spaced upper leg portions which are positioned between the panels of the end wall and engage the ends of the slots in the crates to hold the crates in vertical register, said wire tie element having a bottom portion of inverted U-shape which provides laterally spaced bottom legs in the plane of the upstanding stabilizing part, said spaced bottom legs having bottom end portions which are bent into oppositely facing U-shape with the bight portions in opposed relation, said end portions being adapted to straddle edge portions of the material in the bottom at the ends of the bottom end slot in the lowermost crate of the stack, and the terminal ends of said bottom end portions being bent upwardly to dig into the bottom surface of the bottom wall and prevent displacement of the tie members.

7. A crate locking member adapted to be positioned in the end wall of a tray-like shipping crate and to extend through vertically aligned transversely extending slots in the top and bottom of said end wall, said locking member being formed of relatively rigid bendable wire which is shaped to provide an upright loop with leg forming members which have their uppermost portions laterally spaced and in substantially parallel relation, the lateral spacing of said uppermost portions corresponding approximately with the length of the slots in the crate end wall so as to engage with the ends thereof when positioned in said slots, said leg members having lower portions bent inwardly into engagement with each other and then outwardly and downwardly in diverging relation toward the base of the member, said leg members having the end sections of the lower portions thereof extending in spaced generally parallel relation and terminating in oppositely directed laterally projecting horizontal feet which are in the same plane as the body of the member and which have their ends turned upwardly so as to engage with and dig into the bottom surface of the bottom wall of the crate to hold the leg members in engagement with the ends of the slots.

8. A locking member for use in tying one crate to another which is supported on the top of the same, said crates having a multipanel end wall with vertically aligned top and bottom slots therein, said locking member being adapted to be positioned in the end wall of the crate and to extend through said aligned slots in the top and bottom of said end wall, said locking member comprising a wire element which is shaped to provide a relatively wide top portion adapted to be positioned to extend upwardly between the panels of the end wall with the sides thereof in engagement with the ends of the top slot in the crate end wall, said wire element having a bottom portion which is shaped to provide oppositely directed spaced legs in the plane of the top portion, and said legs each having reversely bent bottom end sections which are adapted to straddle edge portions of the material in the bottom wall at the ends of the bottom slot in the crate end wall, thereby to position the bottom ends of said legs beneath the bottom wall of the crate and in supporting engagement therewith.

9. A locking member for stacked tray-like shipping crates which crates are characterized by a multiple panel end wall structure having vertically aligned slots in the top and bottom thereof, said locking member being adapted to be positioned to extend vertically in the end wall of a bottom crate in the stack and to extend through the end wall of one or more crates positioned above said bottom crate, said locking member comprising a looped wire element having a relatively wide upstanding stabilizing part formed by laterally spaced, upper leg forming portions which are adapted to be positioned between the panels of the crate end wall and to engage the ends of the slot in the top of the crate, said wire element having a bottom portion of inverted U shape which provides laterally spaced bottom leg portions in the plane of the upstanding stabilizing part, said bottom leg portions having spaced bottom end sections which are bent into oppositely facing U shape with the bight portions in opposed relation, said leg end sections being adapted to straddle edge portions of the material in the bottom at the ends of the bottom slot in the crate end, and the terminal ends of said bottom end sections being bent upwardly to dig into the bottom surface of the bottom wall and prevent displacement of the locking member.

10. A locking member for use in tying one crate to another to form a shipping unit which is characterized by a plurality of the crates assembled in vertically aligned stacked relation with each of the crates being of tray-like construction and having a multipanel end wall with aligned top and bottom slots therein, said locking member being adapted to be positioned in a crate end wall and to extend through the vertically aligned slots in the top and bottom of said end wall, said locking member comprising a wire element which is shaped to provide a relatively wide upper portion with the sides thereof formed by wire sections which are spaced laterally so as to engage with the ends of the top slot in the crate end wall, said wire element having a bottom portion which is in the form of an inverted U with laterally spaced legs in the plane of the upper portion, and said legs each having a bottom end section which is bent into U-shape and arranged to straddle edge portions of the material in the bottom wall adjacent an end of the bottom slot in the crate end wall, thereby to position the bottom ends of the bottom forming legs of said locking member in laterally spaced relation beneath the bottom wall of the crate and in supporting engagement therewith.

References Cited in the file of this patent

UNITED STATES PATENTS

| | | |
|---|---|---|
| 1,501,314 | Dailey | July 15, 1924 |
| 2,342,564 | Van Saun | Feb. 22, 1944 |
| 2,594,628 | Evans | Apr. 29, 1952 |
| 2,670,123 | Frankenstein | Feb. 23, 1954 |
| 2,679,970 | Saidel | June 1, 1954 |
| 2,744,675 | Crane | May 8, 1956 |
| 2,750,098 | Levkoff | June 12, 1956 |
| 2,759,652 | Burgess | Aug. 21, 1956 |
| 2,777,627 | Crane | Jan. 15, 1957 |

FOREIGN PATENTS

| | | |
|---|---|---|
| 18,014 | Great Britain | 1909 |

UNITED STATES PATENT OFFICE

CERTIFICATE OF CORRECTION

Patent No. 2,903,176 September 8, 1959

Walton B. Crane

It is hereby certified that error appears in the printed specification of the above numbered patent requiring correction and that the said Letters Patent should read as corrected below.

Column 1, line 69, for "botom" read -- bottom --; column 3, line 37, before "form" insert -- the --; column 9, line 40, for "splits" read -- slits --; column 12, line 8, before "edges" insert -- edge portions cut at their inner marginal --.

Signed and sealed this 15th day of March 1960.

(SEAL)
Attest:

KARL H. AXLINE
Attesting Officer

ROBERT C. WATSON
Commissioner of Patents